United States Patent [19]
Findeisen et al.

[11] 3,758,570
[45] Sept. 11, 1973

[54] PROCESS FOR THE PRODUCTION OF ACYLISOCYANIDE DICHLORIDES AND CARBOXYLIC ACID CHLORIDES

[75] Inventors: Kurt Findeisen; Kuno Wagner, both of Leverkusen, Germany

[73] Assignee: Bayer Aktiengesellschaft, Leverkusen, Germany

[22] Filed: July 19, 1971

[21] Appl. No.: 164,038

[30] Foreign Application Priority Data
July 21, 1970 Germany.................. P 20 36 171.1

[52] U.S. Cl. ....... 260/544 C, 260/290 P, 260/326.8, 260/453 P, 260/544 M, 260/544 L, 260/544 Y
[51] Int. Cl. ............................................ C07c 51/58
[58] Field of Search...................... 260/544 C, 453 P

[56] References Cited
OTHER PUBLICATIONS

Saegusa et al., Tetrahedron, Vol. 24, pp. 3195–3198, (1968)
Kuhle et al. Angew Chem. Int. Edit. Vol. 4, (1965) No. 11

Primary Examiner—Lorraine A. Weinberger
Assistant Examiner—Richard D. Kelly
Attorney—Ralph D. Dinklage and Arnold Sprung

[57] ABSTRACT

Acylisocyanide dichlorides and carboxylic acid chlorides are obtained by reacting a carboxylic acid anhydride and an isocyanide dichloride in the presence of a Lewis acid at a temperature of from 0° to 300° C.

9 Claims, No Drawings

PROCESS FOR THE PRODUCTION OF ACYLISOCYANIDE DICHLORIDES AND CARBOXYLIC ACID CHLORIDES

BACKGROUND

This invention realtes to a process for the production of acylisocyanide dichlorides and carboxylic acid chlorides.

Although it is known that isocyanide dichlorides can be reacted with inorganic acid anhydrides, e.g., $P_2O_5$, only poor yields of isocyanates are obtained under the usual reaction conditions because of secondary reactions (Angew. Chemie, 81, (1969) page 19).

SUMMARY

It has now surprisingly been found that high yields of acylisocyanide dichlorides and carboxylic acid chlorides can be obtained in a smooth reaction by reacting a carboxylic acid anhydride with an isocyanide dichloride corresponding to the formula $$R-CCl_2-N=CCl_2$$

in which R represents halogen, a lower alkyl radical, a lower alkyl radical substituted by halogen atoms, an aryl radical optionally substituted by halogen, lower alkyl, lower alkoxy or nitro or a nitrogen-containing heterocyclic radical comprising a 5- or 6-membered ring optionally substituted by halogen atoms, in the presence of a Lewis acid at a temperature in the range from 0° to 300° C.

DESCRIPTION

Apart from bromine and fluorine, preferred halogen atoms for include chlorine. Lower alkyl and alkoxy radicals contain one to four and preferably one or two carbon atoms and may optionally be substituted by the aforementioned halogen atoms. In addition to the naphthyl radical, the phenyl radical is a preferred optionally substituted aryl radical. Substituents on the aryl radical include the aforementioned halogen atoms and also the aforementioned lower alkyl and alkoxy groups. The nitrogen-containing heterocyclic ring system can contain up to three nitrogen atoms and may optionally be anellated with a benzene ring system.

The reaction is carried out at a temperature of from 0° to 300° C., preferably at a temperature of from 50° to 200° C., most preferably at a temperature of from 100° to 160° C.

The isocyanide dichlorides used in the process according to the invention are known and can be obtained by known methods. The majority of the isocyanide dichlorides suitable for use in the process are described in Angew. Chemie 79, pages 663–680 (1967) and in Angew. Chemie 80, pages 942–953 (1968), both of which are incorporated herein by reference.

Isocyanide dichlorides preferably used in the process include dichloromethyl isocyanide dichloride; trichloromethyl isocyanide dichloride; 1,1-dichloro-2-chloroethyl isocyanide dichloride; pentachloroethyl isocyanide dichloride; and 1-phenyl-1,1,3,3-tetrachloro-2-aza-propene.

The majority of carboxylic acid anhydrides suitable for use in the process are described in Houben-Weyl, Vol. VIII (1952), pages 476–801, and in G.A. Olah "Friedel-Crafts and related reactions" Vol. III, pages 550–598 (1964), both of which are incorporated herein by reference.

Of the carboxylic acid anhydrides quoted in the aforementioned literature references, it is of course possible to use any of those which do not contain any functional groups that would be capable of reacting with isocyanide dichlorides. The majority of these compounds correspond to the general formula

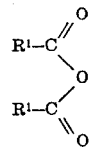

in which the radicals $R^1$, which can be the same or different represent substituted or unsubstituted aliphatic, cycloaliphatic, aromatic or heterocyclic radicals, or together represent a group of the formula $-CH=CH-$ or $-(CH_2)_n-$ (wherein $n$ represents an integer from 1 to 4), or a group of the formula

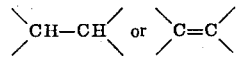

the remaining valence bonds of which are satisfied by inert substituents or form part of a heterocyclic, cycloaliphatic, hydroaromatic or carbocyclic-aromatic ring system.

Naturally, aliphatic radicals also include cycloaliphatic rings. Cycloaliphatic rings are those with five to twelve, preferably with five or six, carbon atoms in the ring system.

Aromatic radicals are those with up to 20 carbon atoms in the ring system, preferably with up to 14 carbon atoms, most preferably with 12, 10 or six carbon atoms.

Heterocyclic radicals are those with 5, 6 and 7-membered rings, preferably with 6 membered rings, which contain as hetero atoms oxygen, nitrogen or sulphur, preferably nitrogen and, in the case of 5-membered rings, oxygen or sulphur in addition to nitrogen.

The following are examples of substituents for the radicals $R^1$ or for the ring systems in which they are present together :

Halogens (preferably fluorine, chlorine or bromine); The cyano; nitro, COCl–; $SO_2Cl$–; trifluoromethyl; alkoxy groups, preferably with one to four carbon atoms; alkylcarboxy groups (preferably with one to six carbon atoms); benzyl; phenethyl; aroyl (especially benzoyl or naphthoyl); alkoxy, preferably with one to four carbon atoms; aryloxy (especially phenoxy or naphthoxy); aryl (preferably phenyl or naphthyl); and, especially in the case of the carbocyclic heterocyclic ring systems, especially those of aromatic character, alkyl radicals with one to eight, preferably with one to four, carbon atoms. Particular reference is made to the fact that, contrary to the exception made in the quotation of carboxylic acid anhydrides, the carboxylic acid and sulphonic acid groups also constitute such substituents, even in the form of single or mixed anhydrides. COCl is formed from COOH, whilst mixed acid chlorides are formed from mixed anhydrides, for example in accordance with the following equation:

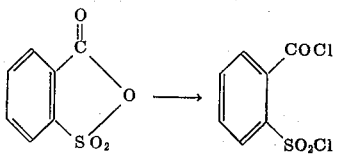

The following are examples of suitable anhydrids: acetic anhydride, propionic acid anhydride, butyric acid anhydride, succinic acid anhydride, glutaric acid anhydride, maleic acid anhydride, hexahydrophthalic acid anhydride, 4-methyl hexahydrophthalic acid anhydride, tetrahydrophthalic acid anhydride, phthalic acid anhydride, tetrachlorophthalic acid anhydride, tetrabromophthalic acid anhydride, naphthalic acid anhydride, 4-nitronaphthalic acid anhydride, pyromellitic acid dianhydride, perylene tetracarboxylic acid-3,4;9,10-dianhydride, benzophenone-3,4;3',4'-dianhydride, or benzoic acid sulphonic acid-(2)-endo-anhydride.

The Lewis acids used for the process according to the invention are also known (G.A. Olah "Friedel-Crafts and Related Reactions" Vol. 1, pages 25 – 30, J. Wiley & Sons, 1963), which is incorporated herein by reference.

Examples of suitable Lewis acids include ferrous chloride, stannic chloride, antimony trichloride, antimony pentachloride, boron trifluoride, boron trifluoride etherate, stannous chloride, hydrogen chloride, aluminium chloride hydrochloride ($HAlCl_4$), and preferably ferric chloride and zinc chloride.

The process is carried out simply by combining the reaction components. In general, the molar ratio is about 1:1. The catalyst is generally used in a quantity of from 0.1 to 10 percent by weight, preferably in a quantity of from 1 to 3 percent by weight, based on the isocyanide dichloride. It is of course also possible, when desired, to use larger quantities of catalyst. The fact that the process according to the invention can be carried out at all must be regarded as particularly surprising, because secondary reactions had been expected according to the literature. However, acyl isocyanide dichlorides and dicarboxylic acid chlorides are surprisingly obtained in high yields in the absence of secondary reactions by the process according to the invention. Even the otherwise substantially inaccessible fumaric acid dichloride can be obtained in high yields and in highly pure form. The process is illustrated by way of example below with reference to the reaction of trichloromethyl isocyanide dichloride with maleic acid anhydride, chlorocarbonyl isocyanide dichloride and fumaric acid dichloride being obtained:

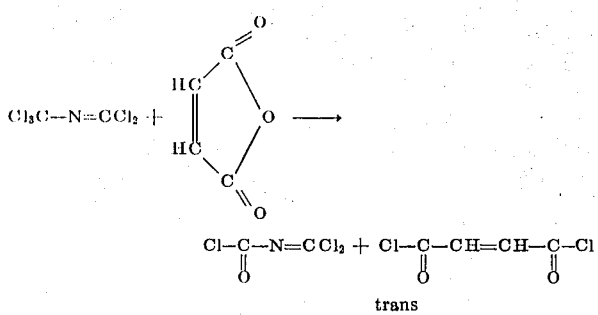

The process according to the invention is generally carried out in the absence of solvents. If the melting point of one of the reactants is above the reaction temperature, or if one reactant is insoluble in the other, it is best to use inert solvents such as chlorobenzene, dichlorobenzene, nitrobenzene or dioxan etc., in order to accelerate the reaction.

If the reaction temperature is above the boiling point of one of the reagents, the reaction can be carried out in a suitable pressure vessel. The process can of course be carried out either continuously or batchwise. The oxygen-containing compounds formed during the reaction from the isocyanide dichlorides are usually in the form of the acyl isocyanide dichlorides. It is, however, known from the literature (Angew. Chemie 74, 848–855 (1962) that chlorotropy can occur in acyl isocyanide dichlorides. In the present instance, too, the effect of this would be that the corresponding isocyanates and the corresponding chlorocarbonyl imide chlorides would be formed instead of acyl isocyanide dichlorides.

The reaction mixtures can be worked up in the usual way by distillation. The compounds which can be obtained by the process according to the invention, some of which are extremely difficult to obtain otherwise, are valuable intermediates for the production of pesticides, dyes and plastics, and are themselves active in these directions.

The general usefulness of the carboxylic acid or dicarboxylic acid chlorides obtainable by the process according to the invention is known. For example, phthaloyl chloride can be converted into a yellow dye with 1-amino anthraquinone in accordance with U. S. Pat. specification No. 2,727,044. Phthaloyl chloride can of course also be used in the synthesis of plasticisers, synthetic resins and the like and for the production of organic compounds (cf. Chemielexikon: H. Rompp, Vol. 3, page 4921, 6th edition). Acetyl chloride is known as a reagent in chemical analysis and is used as a catalyst for esterification reactions, for the halogenation of aliphatic acids and for chemical synthesis, for example in the production of acetyl salicyclic acid (Chemielexikon: Rompp,I, p. 31, 6th, ed.). Longer-chain dicarboxylic acid chloride can be used in the production of polyamides; see U. S. Pat. No. 2,130,523; and Journal Polym. Science 40, page 289 (1959). The acyl isocyanide dichlorides formed during the reaction can also be used in known manner for further reactions. For example, they are suitable for the production of stabilisers for plastics. Because of their sensitivity to moisture and water, they can also be used as dehydrating agents. They are also suitable for use as intermediates in the production of fungicides, for example by reaction with o-phenylene diamine (see Belgian Pat. No. 752,513, and German Offenlegungsschrift P 19 32 297.5).

The following examples, wherein the temperatures are given in °C, are intended to further illustrate this invention without limiting same.

EXAMPLE 1

49.6 g of phthalic acid anhydride, 71.6 g of trichloromethyl isocyanide dichloride and 1 g of ferric chloride are heated for 4 hours at 150° C. in a spherical flask. The following are obtained during distillation :

66 g of phthalyl chloride (92.5 percent of the theoretical) b. p. 131°C./9 Torr and 52 g of chlorocarbonyl isocyanide dichloride (92 percent of the theoretical)
b.p. 123° – 125°C./760 Torr.

EXAMPLE 2

149.25 g of pentachloroethyl isocyanide dichloride and 74 g of phthalic acid anhydride are mixed while stirring with 2 g of ferric chloride in a 250 ml capacity 3-necked flask. The mixture is then heated with stirring for 5 hours at 165° C. The reaction mixture is distilled, giving 104 g of pentachloroethyl isocyanate (82 percent of the theoretical). b.p. 89° – 93°C./12 Torr, and 98 g of phthalyl chloride (96.5 percent of the theoretical), b.p. 133°C./10 Torr.

EXAMPLE 3

77 g of hexahydrophthalic acid anhydride and 107.5 g of trichloromethyl isocyanide dichloride are heated for 3 hours at 140° C. in the presence of 2 g of aluminium chloride in a 0.3 litre capacity autoclave. After the autoclave has been flushed with nitrogen and emptied, its contents are distilled, giving 75 g of hexahydrophthalic acid dichloride (72.5 percent of the theoretical) b.p. 120° – 126°C./15 Torr, and 69 g of chlorocarbonyl isocyanide dichloride (86 percent of the theoretical) of b.p. 125° C.

EXAMPLE 4

375 g of maleic acid anhydride are introduced into a 1.5 litre capacity 3-necked flask, followed by the addition through a dropping funnel of 821 g of trichloromethyl isocyanide dichloride. Following the addition of 8 g of stannic chloride, the mixture is heated for 60 minutes at 130° C., as a result of which the reaction mixture begins to boil under reflux. The reaction is over after 3 hours at this temperature. The reaction products obtained are fractionated, giving 543 g of fumaric acid dichloride (93 percent of the theoretical), b.p. 158° – 160° C., and 540 g of chlorocarbonyl isocyanide dichloride (88 percent of the theoretical), b.p. 123° – 125° C.

EXAMPLE 5

100 g of 1-phenyl-1,1,3,3-tetrachloro azapropene are heated with stirring for 3 hours at 140° C. with 38.1 g of maleic acid anhydride and a small quantity (taken from the tip of a spatula) of zinc chloride. On completion of the reaction, the reaction mixture is fractionated giving 46 g of fumaric acid dichloride (75 percent of the theoretical), b.p. 158° – 160°C./760 Torr, and 52 g of α-chlorobenzylidene carbamic acid chloride (66 percent of the theoretical), b.p. 145° – 150°C./12 Torr.

EXAMPLE 6

75 g of acetic acid anhydride and 158 g of trichloromethyl isocyanide dichloride are gradually heated to 100° C. in the presence of 1 g of ferric chloride. Refluxing in the condenser is noticeable at temperatures as low as 97° C. The reaction mixture obtained is distilled, giving 108 g of acetyl chloride (94 percent of the theoretical) and 66 g of chlorocarbonyl isocyanide dichloride (78 percent of the theoretical).

EXAMPLE 7

65 g of propionic acid anhydride and 107.5 g of trichloro-methyl isocyanide dichloride are heated for 3 hours at 60° C. with 2 g of stannous chloride. Distillation gives 67 g of propionic acid chloride (71.5 percent of the theoretical) and 49 g of chlorocarbonyl isocyanide dichloride (61.5 percent of the theoretical).

EXAMPLE 8

92 g of benzoic acid-sulphonic acid endoanhydride, 107.5 g of trichloromethyl isocyanide dichloride and 2 g of ferrous chloride are heated for 2 hours at 140° C. in 300 ml of o-dichlorobenzene. On completion of the reaction, the chlorocarbonyl isocyanide dichloride and the o-dichlorobenzene are separated by distillation, and the residue obtained is recrystallised from petroleum ether, giving 65 g of chlorocarbonyl isocyanide dichloride (81 percent of the theoretical) and 86 g of benzoyl chloride-2-sulphochloride (72 percent of the theoretical) of b.p. 37° – 39° C.

EXAMPLE 9

72.7 g of benzene tetracarboxylic acid anhydride and 143.6 g of trichloromethyl isocyanide dichloride are heated for 1 hour at 50° C. and for 1 hour at 140° C. in the presence of 2 g of ferric chloride. The resulting reaction mixture is distilled, giving 99 g of benzene-1,2,4,5-tetracarboxylic acid chloride (91 percent of the theoretical), b.p. 174° – 176° C./2 Torr, and 98.5 g of chlorocarbonyl isocyanide dichloride (92 percent of the theoretical).

EXAMPLE 10

57 g of glutaric acid anhydride and 107.5 g of trichloromethyl isocyanide dichloride are heated for 10 minutes at 140° C. in the presence of zinc chloride. The dark-coloured reaction solution is distilled, giving 52.5 g of glutaric acid dichloride (62 percent of the theoretical), b.p. 107° – 108°C./16 Torr, and 63.5 g of chlorocarbonyl isocyanide dichloride (79 percent of the theoretical).

What we claim is:

1. Process for preparing chlorocarbonyl isocyanide dichloride and carboxylic acid chlorides which comprises reacting a carboxylic acid anhydride having the formula

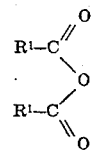

wherein the radicals R', which can be the same or different, represent substituted or unsubstituted aliphatic, cycloaliphatic, aromatic or heterocyclic radicals, or together represent a group of the formula –CH=CH– or –(CH$_2$)$_n$–, wherein $n$ represents an integer from 1 to 4, or a group of the formula

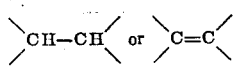

the remaining valence bonds of which are satisfied by inert substitutents or form part of a heterocyclic, cycloaliphatic, hydroaromatic or carbocyclic-aromatic ring system, with trichloromethyl isocyanide dichloride in the presence of a Lewis acid at a temperature of from 0° to 300°C.

2. Process as claimed in claim 1, wherein the Lewis acid is selected from the group of aluminium chloride, ferrous chloride, ferric chloride, zinc chloride, stannous chloride, stannic chloride, antimony trichloride, antimony pentachloride, boron trifluoride, boron trifluoride etherate, hydrogen chloride and aluminium chloride hydrochloride.

3. Process as claimed in claim 1 wherein the temperature is from 50° to 200° C.

4. Process as claimed in claim 1 wherein the temperature is from 100° to 160° C.

5. Process as claimed in claim 1 wherein the carboxylic acid anhydride is selected from the group of aceticanhydride, propionic acid anhydride, butyric acid anhydride, succinic acid anhydride, glutaric acid anhydride, maleic acid anhydride, hexahydrophthalic acid anhydride, 4-methyl hexahydrophthalic acid anhydride, tetrahydro-phthalic acid anhydride, phthalic acid anhydride, tetrachlorophthalic acid anhydride, tetrabromophthalic acid anhydride, naphthalic anhydride, 4-nitronaphthalic acid anhydride, pyromellitic acid dianhydride, perylene tetracarboxylic acid-3,4;9,10-dianhydride, benzophenone-3,4;3',4'-dianhydride and benzoic acid sulphonic acid-(2)-endo anhydride.

6. Process as claimed in claim 1 wherein the amount of Lewis acid is from 0.1 to 10 percent by weight, based on trichloromethyl isocyanide dichloride.

7. Process as claimed in claim 1 wherein the amount of Lewis acid is from 1 to 3 percent by weight, based on trichloromethyl isocyanide dichloride.

8. Process as claimed in claim 1 wherein one of the reactants has a melting point above the reaction temperature or is insoluble in the other reactant and wherein reaction is carried out in an inert solvent.

9. Process as claimed in claim 8 wherein the solvent is chlorobenzene, dichlorobenzene, nitrobenzene or dioxan.

* * * * *